United States Patent [19]

Adams et al.

[11] 4,134,218
[45] Jan. 16, 1979

[54] BREAST CANCER DETECTION TRAINING SYSTEM

[76] Inventors: Calvin K. Adams; Mark K. Goldstein; Deborah C. Hall; Larry L. Hench; Michael C. Madden; Henry S. Pennypacker, Jr.; Gerald H. Stein, all c/o of The J. Hillis Miller Health Center, Center for Ambulatory Studies, University of Florida, Box J-17, Gainesville, Fla. 32610

[21] Appl. No.: 841,076

[22] Filed: Oct. 11, 1977

[51] Int. Cl.² .............................................. G09B 23/28
[52] U.S. Cl. .......................................................... 35/17
[58] Field of Search ............................................. 35/17

[56] References Cited

U.S. PATENT DOCUMENTS

| | | | |
|---|---|---|---|
| 3,520,071 | 7/1970 | Abrahamson | 35/17 |
| 3,564,729 | 2/1971 | Ackerman | 35/17 |
| 3,662,076 | 5/1972 | Gordon | 35/17 |
| 3,681,787 | 8/1972 | Perras | 3/36 |
| 3,742,935 | 7/1973 | Baessler | 128/2 R |
| 3,942,516 | 3/1976 | Glynn | 128/2.1 B |
| 4,001,951 | 1/1977 | Fasse | 35/17 |

OTHER PUBLICATIONS

Ortho Pharmaceutical Corp. Brochure Dated 1973 Describing "Betsi" Breast Teaching Model.
Spenco Medical Corp Brochure Describing the Spenco Breast Cancer Teaching Model dated 1975.
Page 9 of Spenco Medical Corp Catalog 1976 Describes Breast Cancer Teaching Model.

*Primary Examiner*—Harland S. Skogquist
*Attorney, Agent, or Firm*—Seidel, Gonda & Goldhammer

[57] ABSTRACT

A method, apparatus and a lifelike model of a human female breast form a breast cancer detection training system. The model closely simulates the feeling of the different tissues of the human breast and except for a tumor-free comparison model, contains at least one simulated tumor. When used in conjunction with the electronic training apparatus, the model also contains a pressure sensing means. The apparatus and method compare signals initiated by the trainee with stored signals representative of the number of simulated tumors in the model, their location, and the pressure required to feel them and provide feedback information to the trainee so as to improve the trainee's examination technique.

19 Claims, 7 Drawing Figures

BREAST CANCER DETECTION TRAINING SYSTEM

BACKGROUND OF THE INVENTION

The present invention relates to a method, apparatus and a realistic model of a human female breast which are used to train doctors, nurses and other health professionals in the palpation method of breast examination, and is particularly useful in training women how to conduct breast self-examination.

Breast cancer is among the most common malignant tumors and is the leading cause of death from cancer among women in the United States. It is estimated that 1 out of every 15 American women will develop the disease at some time during her life, and that 20% of deaths from cancer among women are attributable to breast cancer. There has been no great reduction in the mortality rate of this disease in the past 35 years.

It is well recognized that early detection of breast cancer is the single most important variable in the successful cure and treatment of the cancer. Various methods for detecting breast cancer include angiography, ultrasonography, isotope scanning, thermography, mammography and manual palpation. All of these techniques except for manual palpation are time consuming, expensive and require the interpretation of a trained specialist. In addition, recent studies suggest that mammography itself may be a cause of breast cancer.

Of all of these techniques for detecting breast cancer, the easiest and least expensive method is manual examination. The potential effectiveness of manual examination, and particularly breast self-examination, in detecting small tumors relies on the effectiveness of manual palpation. Approximately 94% of breast cancers are potentially palpable and are candidates for early manual detection. It has been estimated that the expected death rate due to breast cancer could be halved if the size of the detected tumors could be reduced to less than about 2 cm. It has been indicated that further progress in breast cancer control is conditioned on progress in self-examination instruction, so that women are more comfortable and confident in performing breast self-examination.

The present invention is based upon the clinical and experimental evidence that a systematic approach to manual breast examination can lead to the early detection of smaller tumors through training. See the following papers, the disclosures of which are hereby specifically incorporated herein by reference: C. K. Adams et al., "Lump Detection In Simulated Human Breasts," *Perception & Psychophysics*, 20(3), pp. 163-167 (1976); D. C. Hall et al., "Progress In Manual Breast Examination," *Cancer*, Vol. 40, No. 1, July, 1977 pp. 364-370.

The present invention comprises a realistic model of the human female breast and a method and apparatus for using a preferred form of the model to train persons how to systematically conduct a manual breast examination with a high degree of confidence. The present invention is clearly distinguishable from the following commercially available devices and patents, which are believed to be the closest prior art:

Ortho Pharmaceutical Corporation has been marketing a breast cancer teaching model in the form of a human female's torso having simulated tumors embedded in the breast. This model is of extremely limited value as an effective teaching tool in that it is made of foam rubber and not at all lifelike. There is no provision made in the model, sold under the trademark "BETSI", for any means to simulate the different types of tissue found in the human breast. In addition, the model is not adapted for use with any sort of means for feeding back information to the trainee.

Spenco Medical Corporation markets a breast cancer teaching model comprising a plurality of simulated tumors within a gel-like substance shaped like a breast. The model comprises a gel-like substance within a protective fabric cover, which serves as a "skin". While this device is an improvement over "BETSI", it lacks the feel of a real breast. The gel-like substance does not have the complexity for simulating adipose, glandular and connective tissue which is found in the human female breast. Moreover, there are no means associated with the model to provide feedback information to the trainee.

U.S. Pat. No. 3,742,935 of Baessler et al. relates to a method and apparatus used in teaching palpation techniques. A pressure transducer is in pressural engagement with the skin of a patient adjacent to an area of the body which generates changes in pressure, such as blood vessels, the heart, the larynx, etc. The transducer is connected through an amplifier to a master unit and a plurality of slave units. By monitoring the output of the transducer through the amplifier, a physician or other teacher can instruct the students on the techniques of palpation by means of the slave units which reproduce the vibrations transmitted by the blood vessels, heart, larynx or other source. The method and apparatus described in this patent is of no use in teaching the palpation of passive areas of the body, such as breast tumors. Thus, while blood vessels, the heart and larynx all cause pressure displacements, such as pulses and voice vibrations, no such displacements are created by breast tumors.

U.S. Pat. No. 3,942,516 of Glynn et al. discloses a system and method for use in training persons how to control various biological functions, such as muscle activity, by means of monitoring electrical signals generated by the body, such as brain waves, differential skin temperature and muscle tension measurements. The system and method described in the patent require that electrodes be attached to the patient/trainee to monitor his physiological condition. This patent does not teach or suggest the use of a model for training purposes and its interrelationship with a trainee.

U.S. Pat. No. 3,681,787 of Perras discloses a breast prosthesis to be implanted in a woman's chest. The prosthesis contains gels of different viscosities and densities to maintain the configuration of the prosthesis, and to retain the desired consistency and appearance. It is clear that the placement of the denser, more viscous gels in the patented prosthesis is not intended to simulate the feeling to the touch of real breast tissue. Rather, the different gels of the prosthesis are to maintain the shape and appearance of the prosthesis, and not to provide a realistic feel during palpation. Moreover, this patent neither teaches nor suggests the use of the prothesis as a model for breast cancer detection training.

SUMMARY OF THE INVENTION

One portion of the present invention comprises a lifelike model of a human female breast comprising a membrane which simulates skin, first means having an irregular surface for simulating glandular, connective and/or skeletal tissue, the first means being connected to the membrane to define a chamber therebetween, second means for simulating adipose (fatty) tissue disposed within the chamber, and third means for simulating at least one tumor fixed within the chamber. When the model is used with the apparatus of the present invention, it is preferred that the model contain pressure sensing means.

The method according to the present invention of training a person to detect breast tumors by palpating a model of a human breast which may be provided with one or more simulated tumors comprises: (1) selectively applying pressure in a pattern to the model of the human breast; (2) automatically generating a set of signals representative of the pattern of pressure applied to the model; (3) storing reference information representative of a predetermined pattern of pressure which must be applied to the model to detect a simulated tumor therein; (4) selectively generating a condition signal indicative of detection or lack of detection of a simulated tumor; (5) comparing the stored reference information to the set of signals; and (6) indicating whether the condition signal correctly indicates detection or lack of detection of a tumor as a function of step (5).

Apparatus in accordance with the present invention for training a person to detect breast tumors by applying pressure in a pattern to a model of a human breast provided with one or more simulated tumors comprises: first means for generating a set of signals representative of the pattern of pressure applied to the model; second means for storing reference information representative of a predetermined pattern of pressure which must be applied to the model to detect a simulated tumor therein; third means for generating a condition signal indicative of detection or lack of detection of a simulated tumor; fourth means for comparing the stored reference information to the set of signals; and fifth means for indicating whether the condition signal correctly indicates detection or lack of detection of a tumor.

The system of the present invention is used to analyze a trainee's search pattern and provide the trainee with feedback on the effectiveness of the search. This will reinforce detection of the smallest palpable simulated tumors by delivering visual and/or auditory information for both successful and unsuccessful detections. Information concerning breast, tumor and trainee variables will be considered by the system according to the present invention for increasing the accuracy and regularity of breast self-examination and decreasing the size of the tumor detected.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE PREFERRED EMBODIMENTS

Figures 1, 1A, 2:
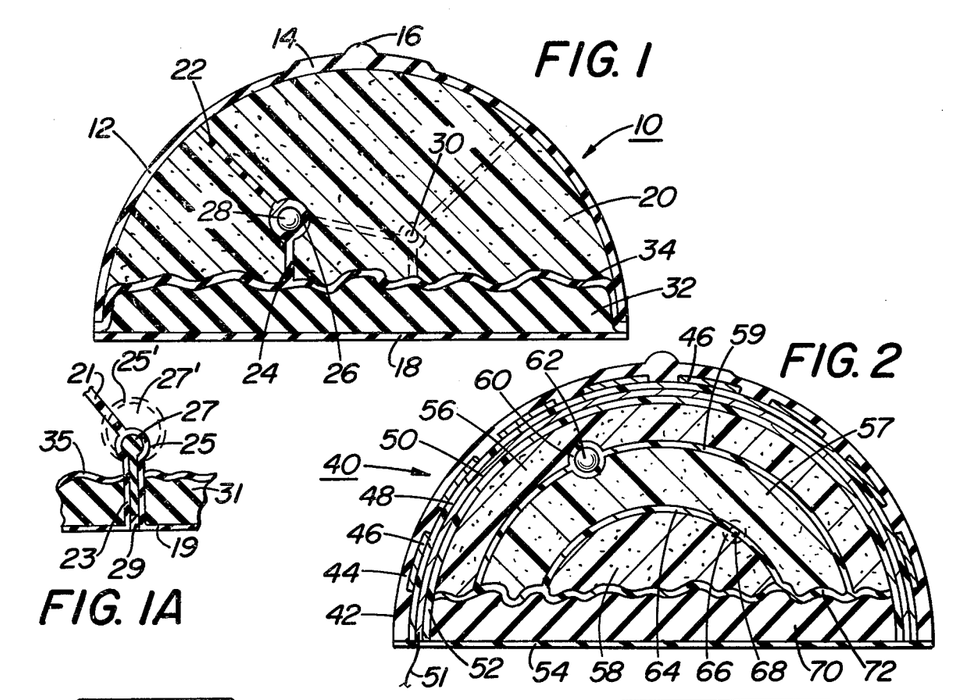
FIG. 1 is a sectional view of one embodiment of a simple breast model according to the present invention.
FIG. 1A is a fragmentary sectional view of a breast model illustrating means for forming variable-sized simulated tumors.
FIG. 2 is a sectional view of one embodiment of a breast model incorporating pressure sensing means in accordance with the present invention.

Referring to the drawings in detail, wherein like numerals indicate like elements, there is shown in FIG. 1 one embodiment of a realistic, lifelike model of a human female breast 10. It is important that the model have physical characteristics which closely simulate human tissue so that examination techniques will be learned through actual practice with realistic stimuli. It is preferred that models be available in several sizes with varying degrees of firmness so as to apply to a large cross-section of women.

The model is substantially hemispherical in shape and generally comprises a skin enclosing silicone gel or other means of simulating breast tissue and means for simulating tumors, except where a tumor-free model is desired for comparison purposes.

Skin 12 may be made of any material which closely simulates human skin. Presently preferred materials include elastomeric silicone resin polymers commercially available from General Electric Company and Dow Corning Corporation.

G.E.'s RTV 7100 silicone rubber compound forms a satisfactory membrane or skin for the model. A realistic skin results from mixing 1 part by weight of the curing agent to 50 parts by weight of the base and curing for 1 hour at 100° C or 24 hours at room temperature. The skin is formed by simply brushing a layer of the silicone elastomer onto a suitably shaped mold after applying a release agent, such as silicone oil, and allowing the polymer to cure. An areola region 14 and nipple 16 provide a realistic feel and a tactile reference point for conducting the breast examination. Optical bottom skin 18 and optional membrane 34 may be made of the same type of material as skin 12 and may be formed in the same manner. The membranes are secured together by any suitable adhesive to provide a leak-proof membrane which contains gel 20, simulated tumors 28 and 30 which are fixed within the model by means of elastomeric silicone threads 22 and 24, for example, and means for simulating glandular, connective and/or skeletal tissue 32.

Gel 20 simulates adipose tissue and may be any gel which imparts a realistic feel to the model. A suitable gel is G.E.'s RTV 619 silicone gel containing about 6–8 parts by weight of curing agent to about 100 parts by weight of the base component. This material cures in 24 hours at room temperature, in about 30 minutes at 100° C and in about 15 minutes at 150° C.

The means 32 for simulating glandular tissue, connective tissue, such as muscles, tendons, etc., and skeletal tissue, such as the chest wall, is any substance which may be molded or otherwise formed to have an irregular surface, density and feel of the firmer glandular, connective and skeletal tissue found in the breast. Means 32 need only be made of a material which is harder than gel 20, so as to accurately simulate the firmer tissue. Examples of suitable substances include G.E.'s RTV 619 gel containing about 8–10 parts by weight curing agent to about 100 parts by weight of the base component, and G.E.'s RTV-7 silicone rubber foam, containing about 5 parts by weight stannous octoate curing agent per 100 parts of base component. This material cures at room temperature in about 24 hours, but the cure may be accelerated by heating to about 100°–150° C.

It is not critical to use the particular materials suggested for forming the skin membranes, the gel representating the adipose tissue and the substance used to represent the glandular, connective and/or skeletal tissue. Rather, the only critical requirement is that the model have the complex feel of a real breast. If desired, small particles of silica or other inert material may be added to the gel representing the adipose tissue to provide a granular feel to the model. Various pigments well known to those skilled in the art may be incorporated in the skin-simulating substance to provide a good visual representation of a real breast.

Except for a tumor-free model which is used as a basis for comparison with tumor containing models and to check for false positive responses, the models contain simulated tumors which simulate the types of tumors associated with breast cancer. The models preferably contain more than one simulated tumor. The simulated tumors contained in the models may vary in size, shape, location and consistency, so long as they realistically simulate breast tumors. For convenience, tumors 28 and 30 are represented by stainless ball bearings. Other shapes and consistencies may easily be made from various other materials, for example, nylon, styrene and any other material capable of realistically simulating breast tumors which is compatible with the other materials used in making the model.

As shown in FIG. 1, simulated tumor 28 is encased in silicone membrane 26 which is supported within the model by silicone threads 22 and 24. The supporting threads should be as thin as possible but of sufficient strength to support the simulated tumor in a fixed position within the model. The threads are shown greatly enlarged for purposes of illustration. Thread 24 is shown connected to membrane 34 which separates simulated adipose tissue 20 from the simulated glandular, connective and/or skeletal tissue 32. Although membrane 34 may facilitate the secure fixation of the tumors within the model, membrane 34 is not necessary. In the absence of membrane 34, thread 24 would be directly connected to glandular, connective and/or skeletal tissue simulating means 32.

An alternative means for fixing a plurality of simulated tumors within a model is shown in FIG. 2. Breast model 40 is shown as containing two simulated tumors 62 and 68. These simulated tumors are fixed within the model by means of silicone membranes 59 and 64 which encapsulate at 60 and 66 the tumors 62 and 68, respectively. Membranes 59 and 64 may comprise one or more layers of silicone or like material similar to that used in forming skin 12, threads 22 and 24 and membrane 34 as described with reference to FIG. 1. Membranes 59 and 64 are substantially hemispherially shaped membranes to which the simulated tumors may be affixed by any convenient means, such as encapsulation or by means of suitable adhesives. Membranes 59 and 64 may be connected to optional bottom membrane 72 or may be connected directly to member 70 as desired.

It is preferable to provide several models wherein the simulated tumors are in different locations and are of different sizes and consistencies. Although it has been reported that breast tumors are palpable when they reach about 1–2 cm in approximate diameter, it has been found that people can be trained by using models according to the present invention to palpate simulated tumors between about 1 and 2 mm in approximate diameter. By being able to detect such small tumors by palpation conducted by health specialists or by women during regular self-breast examination, it will be possible to greatly reduce the catastrophic effects of breast cancer by early treatment and cure. One model that has been prepared and used by trainees contains three relatively large lumps 8.7, 11.1 and 12.7 mm in diameter. After working with this model for a while, another model containing five simulated tumors 1.6, 2.4, 3.2, 4.8 and 6.4 mm in diameter was given to the trainees. With practice, most trainees can detect even the smallest tumors.

A more advanced model containing a simulated tumor or tumors which are variable in size may be formed by modifying the model illustrated in FIG. 1 as shown in FIG. 1A. Variable sized tumor 27 comprises a spherical portion 25 supported by thread 21 and tubular member 23 which passes through optional membrane 35, means for simulating glandular, connective and/or skeletal tissue 31 and optional bottom membrane 19. A syringe is inserted through plug 29 to add or remove gel or any other material which can be used to expand the walls of chamber 25 to or from simulated tumor 27 as indicated at 25' and 27'. Plug 29 can be made of any suitable self-sealing polymeric material. By using this embodiment, one model may be adapted to contain simulated tumors which may be increased in size or decreased in size in the same relative location within the model to help the trainee compare the feel of different sized tumors in the same general location.

Model 40 shown in FIG. 2 represents an advanced construction of a lifelike human female breast particularly constructed for use with the apparatus of the present invention.

Model 40 contains a different embodiment of means for simulating adipose, glandular, connective and/or skeletal tissue than the embodiment illustrated in FIG. 1. Adipose tissue is represented by gel 56 in the outer region of the model between membrane 59 and skin 42. Gel 57 between membranes 59 and 64 may be the same as or different than gel 56. It may be desirable to provide a firmer gel 57 for the intermediate portion of the model. The density and viscosity of the gel can readily be varied by adjusting the relative amounts of base material and curing agent. The consistency of gel 57 may be adjusted to simulate firmer glandular tissue found in the human breast.

Likewise, gel 58 may be the same as or different than gels 56 and 57. Preferably, gel 58 is firmer or harder than gels 56 and 57 to represent connective tissue found in the human breast. Base material 70 may be adapted to simulate the chest wall.

Model 40 is thus more complex than model 10. If desired, gels 56, 57 and 58 may be of the same general consistency and means 70 may represent glandular, connective and/or skeletal tissue similar to means 32. Of course, any number of simulated tumors of various sizes, shapes and consistencies may be affixed to any number of membranes corresponding to membranes 59 and 64 within the breast model.

Figure 4:
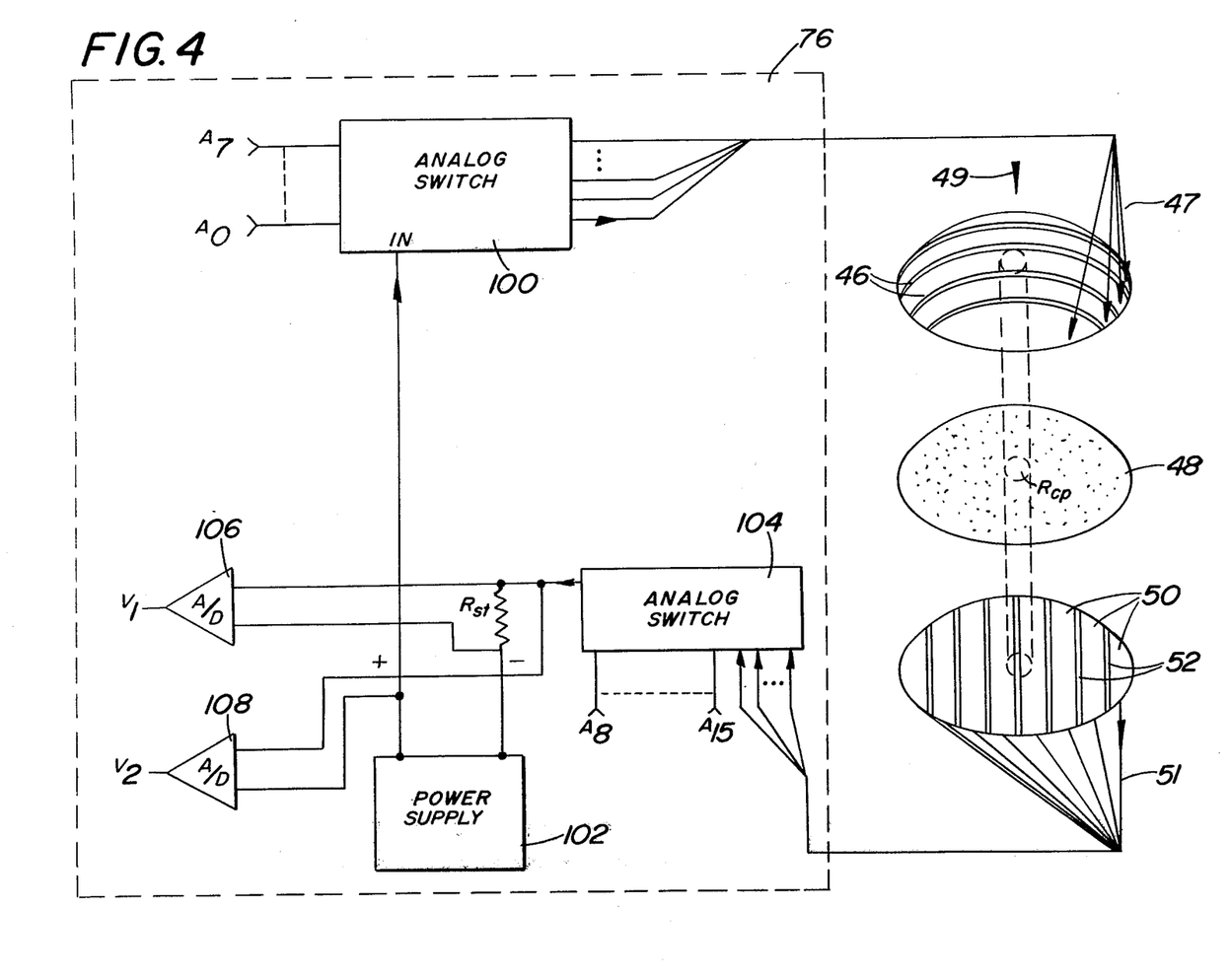
FIG. 4 is a schematic representation of the computer interface circuit.

Skin 42 of model 40 comprises several distinct layers as compared with skin 12 in model 10. Skin 42 comprises a silicone membrane 44 in which is embedded a plurality of flexible electrically conductive strips 46. An exploded view of the electrical components of skin 42 is shown in FIG. 4. Electrical connecting means 47, which may be a wire, pin, plug or the like, is associated with each strip 46. Adjacent to membrane 44 and in contact with electrical strips 46 is a pressure conductive polymer layer 48 which conducts electricity when pressure is applied to the polymer as discussed hereinafter in more detail. A plurality of flexible electrically conductive strips 50 (best seen in FIG. 4) are adjacent to pressure conductive polymer layer 48 and are arranged substantially perpendicular to strips 46. Electrical connection means 51, which may be the same type as connection means 47, are associated with strips 50. Strips 50 are embedded within membrane 52. Thus, skin 42 comprises layers 44, 46, 48, 50 and 52.

Skin 42 in FIG. 2 need not be restricted to the particular model shown in FIG. 2 but may be used with a model constructed in accordance with FIG. 1. Likewise, skin 12 of FIG. 1 may contain the other components of the model illustrated in FIG. 2.

Membranes 44 and 52 may be comprised of the same material used to form skin membrane 12 of model 10. Flexible electrical conductive strips 46 are preferably arranged parallel to each other and perpendicular to parallel flexible electrical conductive strips 50. The strips may be made of any good electrical conductor so long as it is flexible, such as metal foil. Electrical connecting means 47 and 51 may be attached to strips 46 and 50, respectively, in any suitable manner well known to those skilled in the art.

Because of the substantially perpendicular arrangement of strips 46 and 50, a grid or matrix will be formed in the skin of the model. Although any number of strips may be used in the model, generally, the more strips that are used, the more accurately the location of applied pressure can be determined. Strips 46 and 50 may be of any desired dimension in accordance with the degree of sensitivity desired for the particular trainee and the size of simulated tumors contained within the model.

Pressure conductive polymer 48 has an electrical resistance perpendicular to its surface, and accordingly, substantially perpendicular to the surface of the model, which is proportional to the applied pressure. The polymer is an insulator at rest but when pressure is applied it gradually becomes a conductor. When pressure is released, it returns to its original state as an insulator. An excellent property of the pressure conductive polymer is that current flow can be localized. When pressure is applied to the surface of the polymer, only the area directly beneath the pressure source becomes conductive, with little or no lateral flow. The polymer covers an extremely wide range of resistance, for example from 100 megohms, which is fairly good insulator, to 0.1 ohm, which is a useful conductor. The polymer will handle up to 10 amps per square inch intermittently without failure, but lower amperages are recommended. It will sustain up to 600–700 volts but optimum usage is with lower voltages since high voltage overloading will destroy conductivity. Pressure conductive polymers having these characteristics are commercially available from Chomerics, Inc. of Woburn, Mass. and Dynacon Industries, Inc. of West Milford, N.J., for example.

Although the electronic circuitry and particular operation of the entire system will be discussed more fully hereinafter, the function of skin 42 will be described briefly. The application of pressure, such as that encountered during palpation as represented by arrow 49 in FIG. 4, causes the resistance of the pressure conductive polymer in the vicinity of the applied pressure point to decrease. When resistance decreases, electrical conductance increases so that there is an electrical connection between one of the strips 46 and one of the strips 50 at the location where pressure is applied. Thus, the application of pressure at a particular point will generate an electrical signal proportional to the amount of applied pressure and representative of the location of the applied pressure. A greater increase in conductivity would occur where greater pressures are formed on the skin of the model by palpation pressure against a simulated tumor.

A computer interfaces with the matrix formed by strips 46 and 50 via a resistance measuring circuit 76. Circuit 76 measures the voltages $V1$ and $V2$ which provide an indication of the resistance $Rcp$ at each cross point of the matrix. See FIG. 4. The computer calculates the ratio $V2/V1$ and multiplies the ratio by the value of a current measuring resistor $Rst$. The product is the value $Rcp$, the resistance at a cross point of the matrix. The resistance $Rcp$ varies as a function of the pressure applied to model 40. The computer stores the value $Rcp$ calculated for each cross point to form a map of the resistance at all points of the matrix. The map corresponds to the pattern of pressure applied to the model. As described more fully hereinafter, the smallest detectable simulated tumor, the elapsed time required to detect a simulated tumor and other information may be calculated based on the map.

Figure 3:
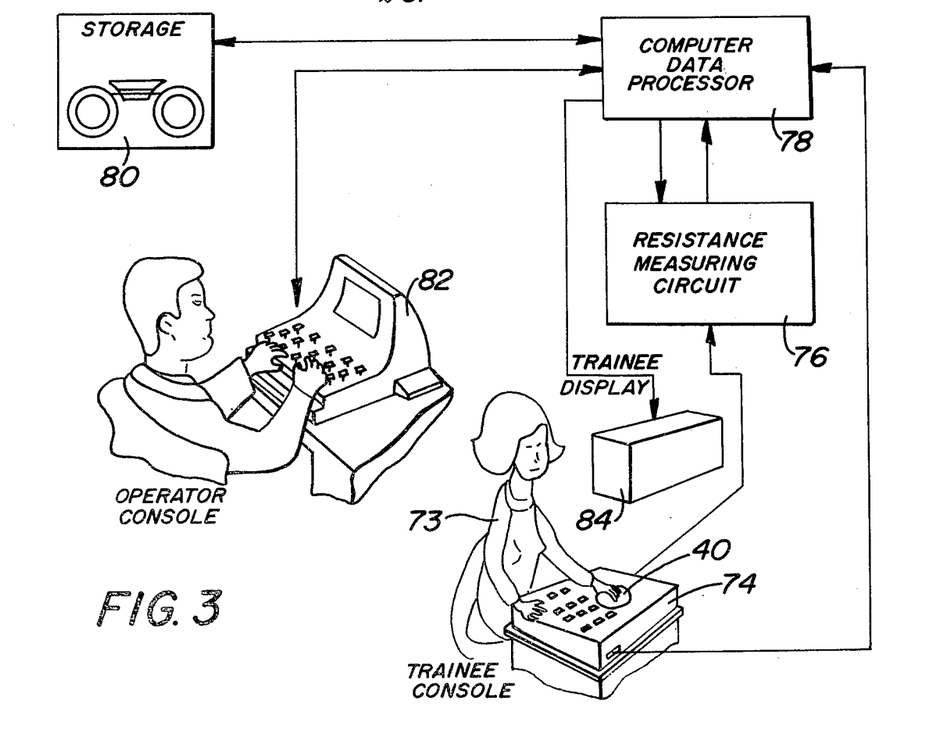
FIG. 3 is a schematic representation of the system of the present invention.

The method of training a person to detect breast tumors in accordance with the present invention will now be described with reference to FIG. 3.

Trainee 73 is instructed in basic palpation techniques used in manual examination or self-examination for breast cancer. For purposes of gaining familiarity with the technique and for basic instruction, a model without pressure sensing means adapted for connection to the apparatus of the present invention may be used. However, to thoroughly train and maintain skill in breast examination, important manual aspects of breast examination should be precisely measured by a system constructed to supply certain information. This information includes the amount and duration of pressure exerted on a given location at a given time and the amount of breast area covered in the entire search. Precise measurement provides quantitative data for analysis of variations in search techniques and their effects on tumor detection and direct feedback can be continuously provided to the operator, teacher or trainee regarding the examination performance. The system of the present invention was developed to provide this information.

A breast model containing pressure sensing means, such as described hereinbefore with respect to model 40 may be placed on any suitable horizontal, vertical or obliquely inclined support for connection with the resistance measuring circuit 76 for eventual connection with the computer data processor. Trainee console 74 comprises a number of switches to be activated by the trainee, including a positive detection switch to be activated when the trainee believes he or she has detected a simulated tumor; a negative detection switch to be activated when the trainee believes that there are no simulated tumors present in the model; a start-stop switch to be activated at the beginning and the end of the palpation of a model; switches to be activated which correspond to various sizes of tumors, such as small, medium or large; and miscellaneous switches such as power on and off, pause, and the like.

Reference information correlated to each breast model is stored in the computer memory. This information includes the number of simulated tumors contained in the breast model, the location of the tumors (which may be expressed as coordinates relating to the electrical conductive strip matrix), the size of each simulated tumor, the amount of pressure (in terms of threshold resistance Rcp) required to detect each simulated tumor, and other variables such as the amount of time to be spent conducting the examination and so forth. The program for operating the computer in accordance with the invention may be stored in memory 80.

Upon receiving a signal from the operator to begin the examination, which may be communicated through operator console 82 to trainee display 84, the trainee begins the manual examination. If the trainee detects a simulated tumor, he activates the positive detection switch. If the trainee does not detect a tumor, he activates the negative detection switch. By means of resistance measuring circuit 76, the computer calculates the resistance Rcp at each cross point of the matrix for the model 40 and stores each calculation in memory to form a map corresponding to the pattern of pressure applied to the model. The computer also compares the map with the stored reference information. The stored reference information relates to a predetermined pattern of pressure which must be applied to the particular model to detect the tumors therein. Based on the comparison, the computer determines whether the positive or negative detections are correct. The map of the pattern of pressure actually applied to the model is indicated to the trainee on display 84. An indication of the correctness of the positive or negative detection, for example, a visual or audible signal, may also be provided on the display. Both the map and the correctness of the detection may be stored for future reference in memory 80 to provide a running check of the progress of the trainee.

The trainee may also activate switches on console 74 relating to the detection of tumor size or other variables useful in teaching the art of palpation to detect breast cancer. Reference information relating to these variables may be stored in memory and accessed for purposes of comparison as previously indicated in connection with the detection of the location of a tumor.

Figure 5A:
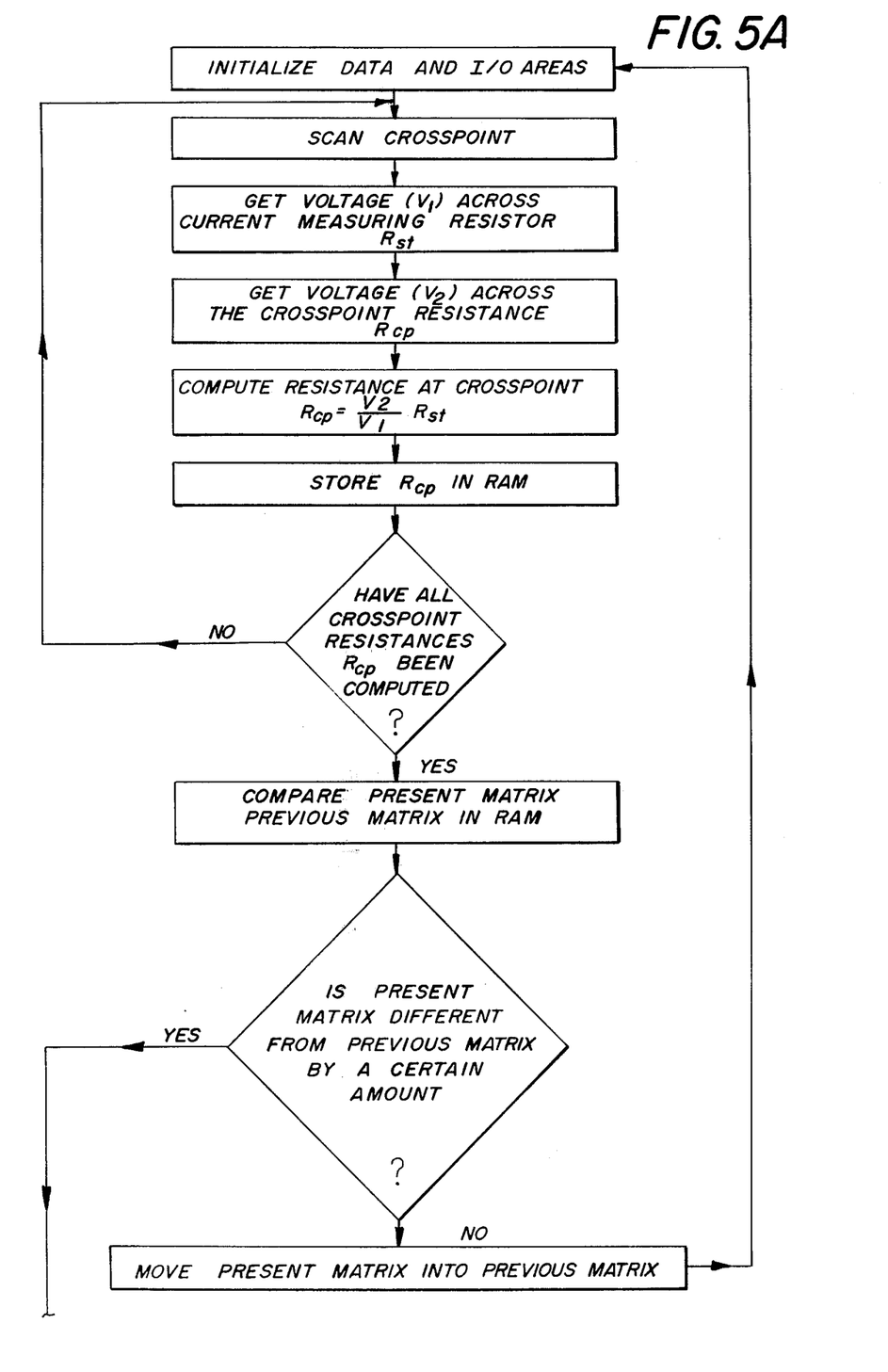
FIGS. 5A and 5B are flow charts illustrating the operation of the system according to the present invention.
Figure 5B:
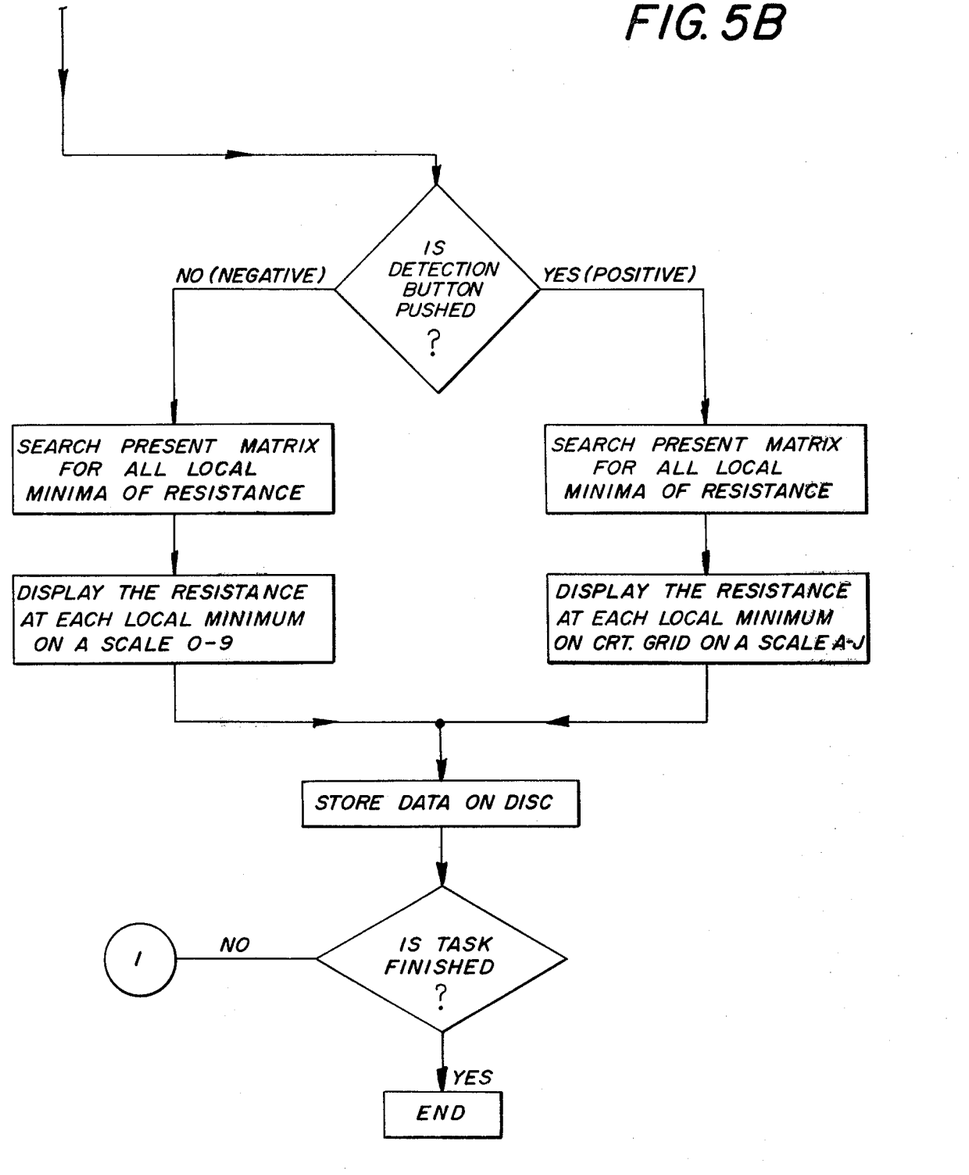

Operation of the system is shown in further detail in FIGS. 5A and 5B.

Initially, when power is applied to the computer 78 (or upon the operation of an initialization switch), the computer enters an initialization routine wherein the appropriate memory areas are cleared. See FIG. 5A. The computer then enters a polling routine in which each of the cross points in the breast model matrix are sequentially activated and scanned via an address bus A0-A15. The least significant byte of the address, bits A0-A7, poll an analog switch 100 which sequentially energizes each of the conductive strips 46. See FIG. 4. The analog switch 100 gates power from a power supply 102 to the strips 46 under control of the address byte A0-A7.

The most significant address byte, bits A8-A15, controls the sequence in which a second analog switch 104 scans the conductive strips 50 via conductors 51. Output current signals of varying amplitudes flow through conductive strips 50 under application of pressure to the breast model. The amplitude of a particular output current signal is a function of the pattern of pressure applied to the model. The rate at which the bits of byte A8-A15 vary to scan analog switch 104 is substantially greater than the rate at which the bits of byte A0-A7 vary to poll analog switch 100. During the period of time that a particular strip 46 is energized by analog switch 100, analog switch 104 scans all of the conductive strips 50 in sequence. By this technique, the resistance Rcp of the polymer 48 at each localized region at which a cross point of the matrix is located can be rapidly computed. The resistance Rcp provides a direct indication of the pressure applied to the model.

More specifically, there is a localized region of polymer 48 having a resistance Rcp associated with each cross point formed by the matrix of conductive strips. Each resistance Rcp is determined by the pattern of pressure applied to the breast model. Each resistance Rcp decreases as the pressure applied to the associated localized region increases. To compute the value of each resistance Rcp, each cross point is energized and scanned by analog switches 100 and 104 under control of computer addressing A0-A15 as previously described. Thus, the resistance Rcp associated with each cross point is electrically connected in sequence via analog switch 100 to power supply 102. In addition, the resistance Rcp is series connected in sequence via analog switch 104 to a reference or current measuring resistance Rst. The resistance Rst is connected to the return of the power supply 102. Accordingly, the resistance Rcp for any cross point is series connected in sequence with the resistance Rst across the power supply terminals. The analog switches 100 and 104 determine which cross point resistance Rcp is connected in series with the resistance Rst at any given instant of time.

An A/D converter 106 senses the voltage developed across the resistance Rst. See FIG. 4. An A/D converter 108 senses the voltage developed across the cross point resistance Rcp. Since the resistances Rst and Rcp are series connected across the power supply terminals, the same current flows through both resistances. Accordingly, the resistance Rcp can be computed as a function of the output voltages V1 and V2 of A/D converters 100 and 104 respectively as follows:

$$, Rcp = Rst(V2/V1)$$

The computer computes the resistance Rcp for each cross point and stores the computed value in RAM. See FIG. 5A.

All of the cross point resistance Rcp are stored in RAM to provide a map of the pattern of pressure actually applied to the breast model in terms of cross point resistances. The computer compares this map of cross point resistances to another map of cross point resistances (similarly obtained) stored in another area of the RAM. The latter map corresponds to an earlier pressure pattern applied to the breast model. The computer compares the two maps to determine whether the current map differs from the earlier stored map by a predetermined "amount". The "amount" of difference between the maps may be measured by the difference in magnitudes between resistances Rcp for a particular cross point or it may be measured by the number of cross points for which a particular magnitude of variation in resistance Rcp is detected from map to map. Other criteria may be used for purposes of the comparison as appears from the following description of the computer control.

If the "amount" of difference between the maps does not exceed the predetermined criteria, it indicates that the pressure pattern currently applied to the breast model by the trainee does not differ sufficiently from the earlier applied pressure pattern to merit further inspection by the computer. Accordingly, the computer erases the earlier stored map of resistances and shifts the current map into the RAM area which had been occupied by the earlier map. See FIG. 5A. The trainee must then apply a new pressure pattern to the breast model. The preceding operations are repeated by the computer until a sufficient "amount" of difference is detected between the new map and the earlier map. This techniques ensures that the trainee will vary his pattern of searching for simulated tumors in the breast model.

If a sufficient amount of difference is detected between the current and earlier stored maps, the computer proceeds to process the current map to provide feedback information to the trainee. In particular, the computer scans the positive and negative detection switches to determine whether either switch has been depressed. If the positive switch has been depressed (indicating that the trainee has detected a tumor), the computer compares the current map of resistances Rcp to a reference map of threshold values of resistance corresponding to the cross points on the matrix. The reference map is stored in memory by operation of the operator console keyboard. Alternatively, the reference map may be permanently stored in memory such as a ROM or equivalent memory. The threshold values in the reference map may vary from cross point to cross point. Each threshold value represents the pressure which should be applied by the trainee at the localized region to detect a particular simulated tumor.

If, based on the comparison of the current map to the reference map, the computer determines that the threshold pressure has in fact been applied to a localized region by the trainee, it stores this information in memory. This indicates that the trainee correctly detected a particular tumor. For each value of cross point resistance Rcp which is below as associated threshold value of resistance, the computer assigns a weight on a predetermined scale. For example, a 10 unit scale may be utilized. The computer operates the trainee display 84 to display the weighted value on a map. For example, the display may comprise a CRT screen, and the characters A-L may be used to identify the weight (representing resistance Rcp) assigned to a particular cross point on the map. Thereafter, the weighted map, as displayed, is stored in storage means 80 and the entire process is repeated.

If the negative detection button is depressed (indicating that the trainee detected no tumor), the computer searches the current map for cross point resistances Rcp which are below their associated threshold resistances. Thus, the computer compares the current map of cross point resistances with the reference map of threshold values, as previously described, to determine which cross point resistance thresholds have been crossed. Thereafter, the computer weights each cross point resistance which has crossed a threshold value according to a 10 unit scale. Each weighted resistance is then displayed on display 84 using a 0-9 numeric scale. The computer also determines whether the trainee correctly operated the detection switch. If sufficient pressure had been applied at a localized region in the breast model to detect a simulated tumor therein, but no detection had been indicated by the trainee, the computer stores this information in memory. This indicates that the trainee failed to detect a particular tumor. In addition, the computer stores the weighted map of cross point resistances Rcp as previously described. Thereafter, the entire process is repeated.

The present invention may be embodied in other specific forms without departing from the spirit or essential attributes thereof and, accordingly, reference should be made to the appended claims, rather than to the foregoing specification as indicating the scope of the invention.

We claim:

1. A lifelike model of a human female breast comprising an elastomeric membrane, first means simulating glandular, connective and/or skeletal tissue, the first means being connected to the membrane to define a chamber therebetween, second means simulating adipose tissue disposed within the chamber, the first means being harder than the second means and having an irregular surface within the chamber, and third means simulating at least one tumor fixed within the chamber.

2. A model according to claim 1 wherein a plurality of simulated tumors of different sizes are fixed within the chamber.

3. A model according to claim 1 wherein the simulated tumor is variable in size.

4. A model according to claim 1 wherein the simulated tumor is supported by a plurality of elastomeric threads.

5. A model according to claim 1 wherein the tumor is attached to a layer of elastomeric resin polymer fixed within the chamber.

6. A model according to claim 1 further comprising pressure sensing means within the model.

7. A model according to claim 6 wherein the pressure sensing means comprises a first series of electrical conductors adjacent to a polymer having an electrical conductivity substantially directly proportional to the amount of pressure applied thereto, and a second series of electrical conductors adjacent to the side of the polymer opposite the side adjacent to the first series, the second series arranged substantially perpendicular to the first series.

8. A method of training a person to detect breast tumors by palpating a model of a human breast provided with one or more simulated tumors, comprising:
    (1) selectively applying pressure in a pattern to the model of the human breast;
    (2) automatically generating a set of signals representative of the pattern of pressure applied to the model;
    (3) storing reference information representative of a predetermined pattern of pressure which must be applied to the model to detect a simulated tumor therein;
    (4) selectively generating a condition signal indicative of detection or lack of detection of a simulated tumor;
    (5) comparing the stored reference information to the set of signals; and
    (6) indicating whether the condition signal correctly indicates detection or lack of detection of a tumor as a function of step (5).

9. The method according to claim 8 including indicating the pattern of pressure applied to the model as a function of step (2).

10. The method according to claim 8 including storing the set of signals generated in step (2).

11. The method according to claim 8 including repeating steps (1)-(6) and maintaining a record of the sets of signals generated by step (2).

12. A method of training a person to detect breast tumors by palpating a model of a human breast provided with one or more simulated tumors, comprising:
(1) storing reference information representative of a predetermined pattern of pressure which must be applied to the model to detect a simulated tumor therein;
(2) selectively applying pressure in a pattern to the model of the human breast;
(3) automatically generating a set of signals representative of the pattern of pressure applied to the model;
(4) storing the set of signals generated in step (3);
(5) repeating steps (2)–(4);
(6) comparing the stored sets of signals to each other; and
(7) comparing one of the stored sets of signals to the stored reference information as a function of step (6).

13. The method according to claim 12 including indicating the pattern of pressure applied to the model as a function of step (4).

14. The method according to claim 12 including repeating steps (1)–(7) and maintaining a record of the sets of signals generated by step 3.

15. Apparatus for training a person to detect breast tumors by applying pressure in a pattern to a model of a human breast provided with one or more simulated tumors, comprising:
first means for generating a set of signals representative of the pattern of pressure applied to the model;
second means for storing reference information representative of a predetermined pattern of pressure which must be applied to the model to detect a simulated tumor therein;
third means for generating a condition signal indicative of detection or lack of detection of a simulated tumor;
fourth means for comparing the stored reference information to the set of signals; and
fifth means for indicating whether the condition signal correctly indicates detection or lack of detection of a tumor.

16. Apparatus according to claim 15 including means operatively associated with the first means for indicating the pattern of pressure applied to the model.

17. Apparatus according to claim 15 including means operatively associated with the first means for storing the set of signals.

18. Apparatus for training a person to detect breast tumors by palpating a model of a human breast provided with one or more simulated tumors, comprising:
first means for storing reference information representative of a predetermined pattern of pressure which must be applied to the model to detect a simulated tumor therein;
second means for generating a set of signals representative of the pattern of pressure applied to the model;
third means operatively associated with the second means for storing the set of signals;
fourth means for comparing the stored set of signals to the stored reference information; and
fifth means operatively associated with the second means for indicating the pattern of pressure applied to the model.

19. Apparatus according to claim 18 including means for selectively generating a condition signal indicative of detection or lack of detection of a simulated tumor, and means for indicating whether the condition signal correctly indicates detection or lack of detection of a tumor.

* * * * *